United States Patent [19]

Carullo

[11] 3,981,549
[45] Sept. 21, 1976

[54] THRUST BEARING WITH FORMED THRUST WASHER

[75] Inventor: Paul A. Carullo, Torrington, Conn.

[73] Assignee: The Torrington Company, Torrington, Conn.

[22] Filed: Sept. 16, 1974

[21] Appl. No.: 506,277

[52] U.S. Cl. .............................. 308/235; 308/202
[51] Int. Cl.² ................................. F16C 33/38
[58] Field of Search .......... 308/219, 161, 175, 235, 308/207 R, 194, 233

[56] References Cited
UNITED STATES PATENTS

| 1,334,265 | 3/1920 | Simmons | 308/235 |
| 1,494,392 | 5/1924 | Loozen | 308/235 |
| 2,665,958 | 1/1954 | Waldherr, Jr. | 308/235 |
| 2,997,349 | 8/1961 | Pitner | 308/235 |
| 3,031,239 | 4/1962 | Pitner | 308/235 |
| 3,317,014 | 5/1967 | Pitner | 308/235 |

Primary Examiner—M. H. Wood, Jr.
Assistant Examiner—Richard A. Bertsch
Attorney, Agent, or Firm—Frank S. Troidl

[57] ABSTRACT

The thrust bearing includes a thrust roller and cage assembly. Either one thrust race or two thrust races may be used. If one thrust race is used, it is made from sheet metal and formed to have at least one annular shoulder adapted to be contacted by the rollers to limit the radial movement of the thrust roller and cage assembly.

If two thrust races are used, either one thrust race or both thrust races may be provided with one or more annular shoulders to limit the radial movement of the thrust roller and cage assembly.

7 Claims, 6 Drawing Figures

THRUST BEARING WITH FORMED THRUST WASHER

This invention relates to thrust bearings. More particularly this invention is a new and novel thrust bearing including a formed sheet metal thrust washer or race with at least one annular shoulder to limit the radial movement of the thrust roller and cage assembly.

In most currently used thrust bearings, the needles or rollers are guided by a cage. However, when such bearings are used in systems, such as automatic transmissions, the inner or outer periphery of the cage often contacts a flange of a race, a housing, a shaft, or an inside pilot. The cutting action of the cage against the flange, housing, shaft, or inside pilot may create such wear on the inner or outer periphery of the cage that there is no longer retention of the roller and cage assembly within the race or the housing. Such separation can cause failure of automotive transmissions. The wear also produces metal powder which gets into the roller track and greatly reduces bearing life. It may also affect the service life of other components of the mechanism in which the bearing is used.

With my new thrust bearing, the cutting action of the cage, by contact of the cage outside periphery or inside periphery with a flange of a race or shaft pilot, or by contact of the cage with the inside of a housing, or shaft, is decreased or eliminated.

Briefly described, my new thrust bearing includes a thrust roller and cage assembly and a formed sheet metal thrust race. The formed sheet metal thrust race has at least one annular shoulder. The radial movement of the thrust roller and cage assembly is limited by contact of the rollers against the annular shoulder in the formed sheet metal thrust race. Neither the inner nor outer peripheries of the cage contact the thrust race, flange, the housing, or shaft. Thus, frictional wear of the inner periphery or outer periphery of the cage and the parts against which it rubs, is eliminated.

The invention, as well as its many advantages, will be further understood by reference to the following detailed description and drawings in which.

In the various figures, like numbers will refer to like parts.

Figure 1:
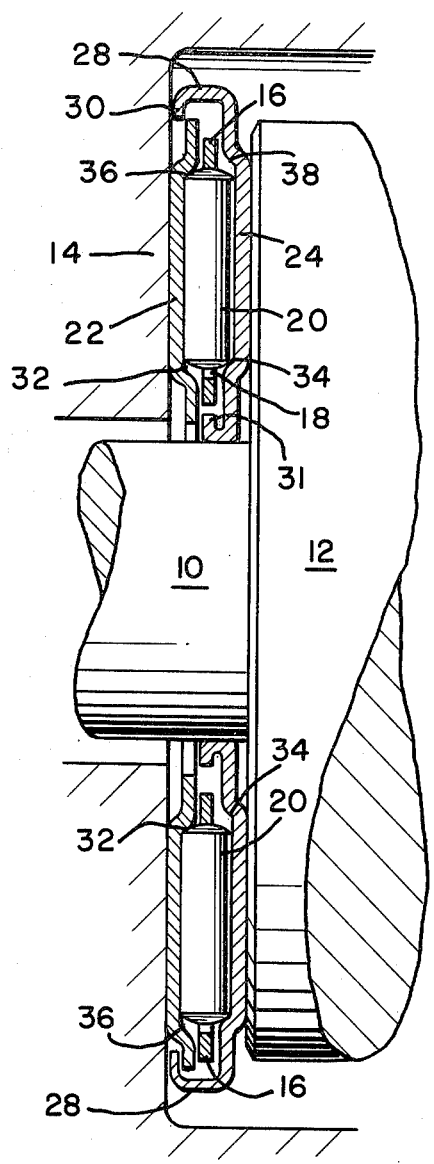
FIG. 1 is a side elevational view, partly in section, showing my new invention.

Referring specifically to FIG. 1, a rotatable shaft 10 having a larger diameter portion 12 is shown rotatably mounted in housing 14. One embodiment of my new thrust bearing is shown mounted in the axial space separating the larger diameter portion of the shaft from housing 14.

The thrust bearing includes a thrust roller and cage assembly consisting of an annular cage 16 provided with circumferentially equally spaced pockets 18 with rollers 20 retained in the pockets 18.

The rollers 20 are in contact with a first formed sheet metal thrust race 22 and a second formed sheet metal thrust race 24. The second thrust race 24 includes an outer flange 28 having a radially turned-in edge 30 which overlaps the outer periphery of the first thrust race 22, and a radially extending portion 31 extending outwardly from the inner periphery of thrust race 22. Thrust races 22 and 24 each have an inner annular shoulder 32 and 34, respectively, and an outer annular shoulder 36 and 38, respectively. These shoulders are easily formed from sheet metal without any grinding operations or milling operations. The inner annular shoulders are radially spaced from the outer annular shoulders by a distance sufficient to provide annular tracks for the rollers. The inner periphery of the cage 16 does not contact thrust race portion 31; and the outer periphery of the cage does not contact the flange 28. Thus, frictional wear and tear of the outer and inner peripheries of the cage is prevented.

Figure 2:
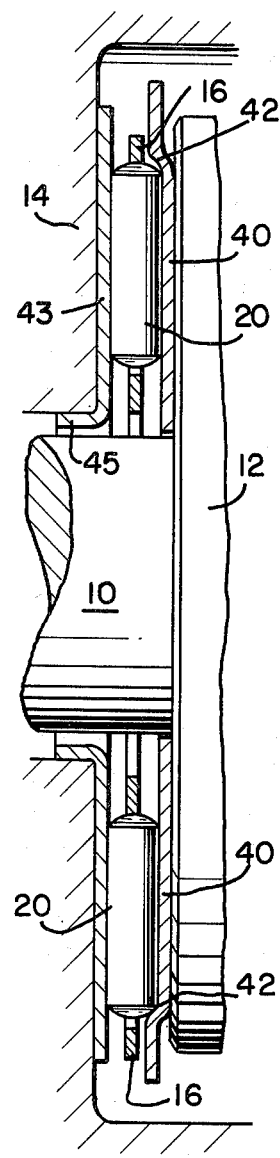
FIG. 2 is a side elevational view, partly in section, showing a modification of my invention.

In FIG. 2, thrust race 40 includes a single annular shoulder 42 located adjacent the outside edges of the rollers. It can be seen that as the thrust roller and cage assembly moves radially, the rollers which move radially outwardly contact the annular shoulder 42 on thrust race 40, thus preventing the inner and outer peripheries of the cage 16 from contacting the shaft 10 or housing 14, respectively. Separate thrust race 43 has an annular flange 45 to locate it in the housing 14 bore.

Figure 3:
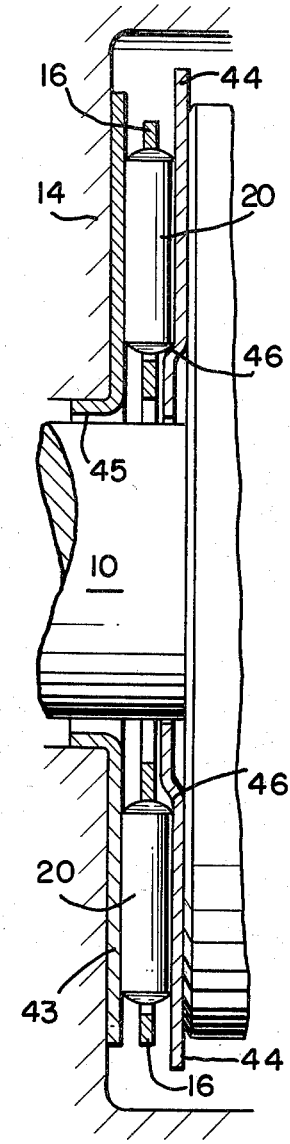
FIG. 3 is a side elevational view, partly in section, showing a further modification.

In the embodiment shown in FIG. 3, the thrust race 44 is provided with an annular shoulder 46 located adjacent the inside edges of the rollers. It can be seen that as the thrust roller and cage assembly moves radially, those rollers 20 located circumferentially in that portion of the cage 16 which is moving radially inwardly, contacts the annular shoulder 46 thus preventing the inner periphery and outer periphery of the cage 16 from contacting the shaft 10 or housing 14, respectively.

Figure 4:
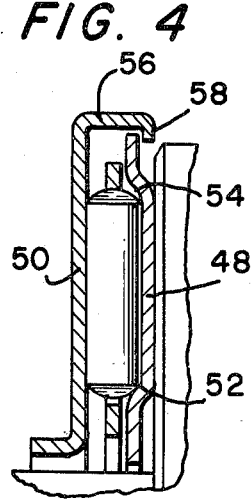
FIG. 4 is a fragmentary side elevational view, partly in section, of a further modification.

In the embodiment shown in FIG. 4, the thrust bearing includes two thrust races 48 and 50. The thrust race 48 includes an inner annular shoulder 52 and an outer annular shoulder 54. The thrust race 50 is flat and thus is not provided with annular shoulders. Thrust race 50 includes an annular flange 56 with a radially turned-in portion 58. The turned-in portion 58 retains thrust race 48 and the thrust roller and cage assembly within the thrust race 50.

Figure 5:
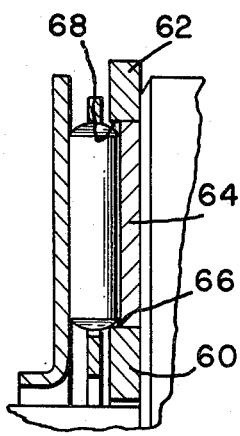
FIG. 5 is a fragmentary side elevational view, partly in section, showing a further modification.

The thrust bearing shown in FIG. 5 includes a thrust race which is made from three distinct parts with each part made of formed sheet metal. The thrust race includes two formed sheet metal rings 60 and 62 and an annular track 64 also formed from sheet metal. The annular plate 64 interconnects the inner ring 60 and the outer ring 62. Rings 60 and 62 are preferably the same length which is greater than the length of plate 64 so that the outer edge of ring 60 provides an annular shoulder 66 and the inner edge of ring 62 provides an annular shoulder 68. As with the other embodiments, these annular shoulders limit the axial movement of the thrust roller and cage assembly. Similarly, the thrust race may be formed of two pieces instead of three.

Figure 6:
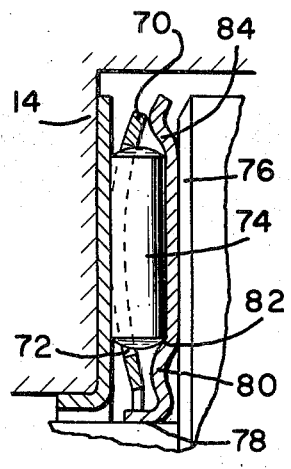
FIG. 6 is a fragmentary side elevational view showing a still further modification.

In the embodiment shown in FIG. 6, the thrust roller and cage assembly includes a curved cage 70 with pockets 72 containing rollers 74. The formed sheet metal thrust race 76 has an inner axial lip 78. The axial lip is connected to a curved annular portion 80 of the thrust race 76. The annular shoulder 82 is formed by the outer edge of curved annular portion 80. A second annular shoulder 84 may be provided adjacent the outer periphery of the thrust race 76. By using the curved annular portion 80, a longer lip 78 may be provided thereby adding rigidity and strength to the thrust bearing. As with the other embodiments, the annular shoulders 82 and 84 limit the axial movement of the thrust roller and cage assembly, thus preventing contact of the inner and outer peripheries of the cage with other parts such as the lip 78 or the inside of the housing 14. This eliminates wear and tear on the inner and outer peripheries of the cage.

It is to be understood that the term "rollers" as used in this description and the claims also includes rollers often referred to as "needles" or "needle rollers."

I claim:

1. A thrust bearing comprising: a thrust roller and cage assembly; and a formed sheet metal thrust race contacted by the round surface of the rollers in the thrust roller and cage assembly and having at least one annular shoulder; the dimensions of the formed sheet metal thrust race, and the dimensions of the thrust roller and cage assembly being such that the thrust roller and cage assembly may move radially with respect to the thrust race; and when the thrust roller and cage assembly is coaxial with the thrust race, a radial space exists between said annular shoulder and the nearer radial ends of the rollers, the nearer radial ends of some of the rollers coming into contact with said annular shoulder if the cage and roller assembly moves radially to thereby limit the radial movement of the thrust roller and cage assembly.

2. A thrust bearing in accordance with claim 1 wherein: the formed sheet metal race has a second annular shoulder radially spaced from the first annular shoulder by a distance sufficient to provide an annular track for the rollers.

3. A thrust bearing in accordance with claim 2 wherein: the annular shoulders are edges of formed sheet metal rings and the annular track is a formed sheet metal annular plate interconnecting the two formed sheet metal rings.

4. A thrust bearing in accordance with claim 2 wherein: a second thrust race is axially spaced from the first thrust race and the second thrust race is also provided with two annular shoulders radially spaced a sufficient distance to provide an annular track for the rollers.

5. A thrust bearing in accordance with claim 1 wherein: the annular shoulder is located adjacent the inside radial end of the rollers.

6. A thrust bearing in accordance with claim 5 wherein: the formed sheet metal thrust race has an axial lip and the annular shoulder is formed by the outer edge of a curved annular portion interconnecting the annular shoulder and an axial end of the axial lip.

7. A thrust bearing in accordance with claim 1 wherein: the annular shoulder is located adjacent the outside radial end of the rollers.

* * * * *